Figure 1:
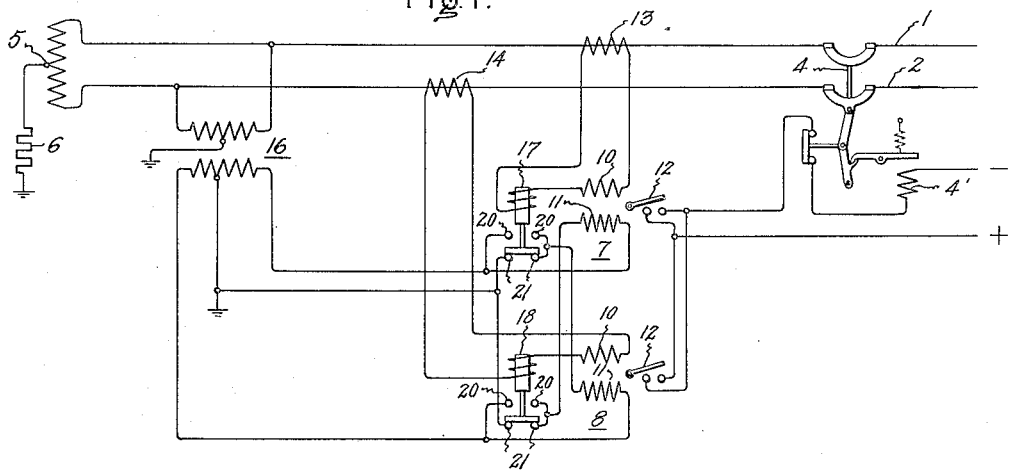

Feb. 16, 1926.

J. BIERMANNS 1,573,623

PROTECTIVE SYSTEM

Filed Feb. 20, 1925

Inventor:
Josef Biermanns,
by
His Attorney.

Patented Feb. 16, 1926.

1,573,623

UNITED STATES PATENT OFFICE.

JOSEF BIERMANNS, OF KARLSHORST, GERMANY, ASSIGNOR TO GENERAL ELECTRIC COMPANY, A CORPORATION OF NEW YORK.

PROTECTIVE SYSTEM.

Application filed February 20, 1925. Serial No. 10,603.

*To all whom it may concern:*

Be it known that I, JOSEF BIERMANNS, a citizen of Germany, residing at Karlshorst, Germany, have invented certain new and useful Improvements in Protective Systems, of which the following is a specification.

My invention relates to improvements in protective systems for electric circuits, and more particularly to improvements in protective systems involving the use of relays in which current and potential windings cooperate to provide a discriminating time action, directional action, or both, and an object of my invention is to provide a protective system having improved operating characteristics.

Abnormal circuit conditions causing excess currents influence one or more of the potentials of an electric system, and consequently in protective systems involving the use of relays which have cooperating current and potential windings and which are to function with a discriminating action dependent on the potential and current, it is essential that at least one relay be energized in accordance with the current and the potential most affected. With ungrounded electric systems, this may be accomplished by providing at the desired points of the system a group of relays, one for each phase conductor having its current winding in series relation therewith and its potential winding connected to be energized in accordance with the potential between this conductor and another conductor. If, however, the system is grounded through a neutral point, it is possible, in order to provide protection against faults between any conductor and ground as well as between any two conductors, to provide another group of relays, one for each conductor having its current winding in series relation therewith and its potential winding connected to be energized in accordance with the potential to ground of this conductor. This involves an undesirable complication and burden for the system to be protected by doubling the number of relays and increasing the cost, inasmuch as relays involving cooperating current and potential windings for discriminating action are relatively complicated and costly in comparison with simple over-current relays.

An object of my invention is to provide an improved protective system wherein relays whose discriminating action is dependent on current and potential can be energized selectively in accordance with the current and potential best adapted to insure the desired discriminating action both on faults between a conductor and ground and also on faults between two or more conductors. Another object of my invention is to provide an improved protective system for an electric circuit wherein the number of relays having cooperating current and potential windings is substantially reduced.

My invention will be better understood from the following description taken in connection with the accompanying drawing and its scope will be pointed out in the appended claims.

Figure 2:
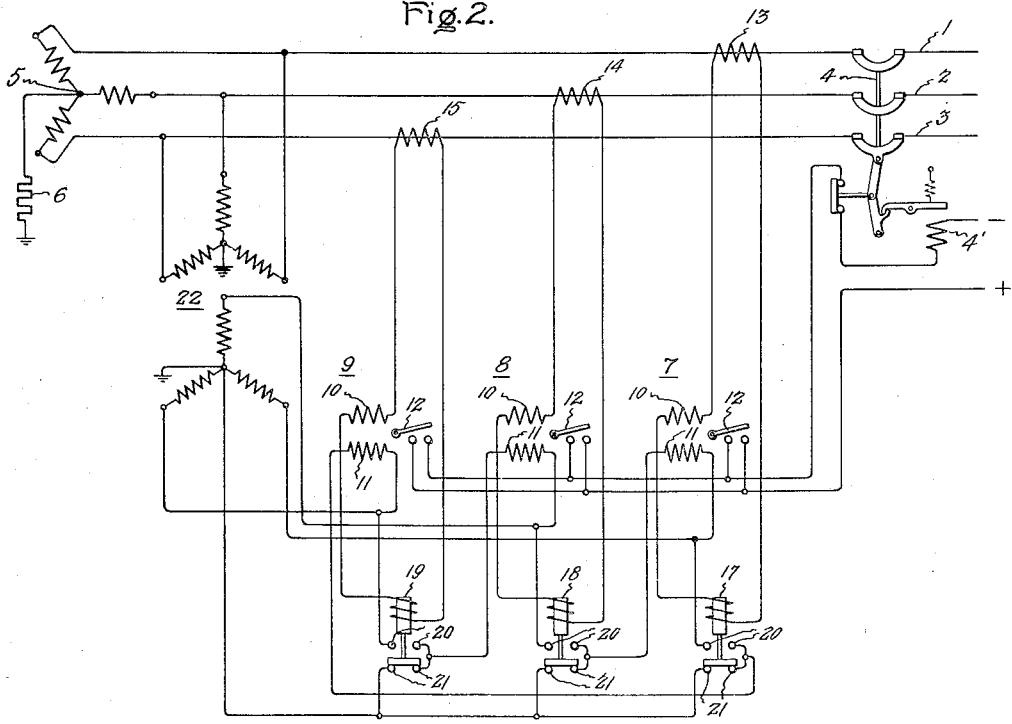

In the accompanying drawing, Fig. 1 illustrates diagrammatically a protective system embodying my invention as applied to a single phase alternating current circuit, and Fig. 2 illustrates diagrammatically a protective system embodying my invention as applied to a three phase alternating current circuit.

In Fig. 1, a single phase alternating current circuit comprising conductors 1 and 2 is arranged to be controlled by a circuit breaker 4 having a trip coil 4'. The circuit has a neutral point 5 which may be grounded either directly or through an impedance 6.

For controlling the circuit breaker 4 through the trip coil 4' upon the occurrence of abnormal circuit conditions, I provide a plurality of relays 7, 8, one for each conductor of the circuit and of the type comprising cooperating current and potential windings or coils 10 and 11 respectively which are arranged to control a circuit controlling member 12 with a time action dependent on the distance between the relay location and the fault point. Such relays, as is well known to the art, are distributed along the circuit at suitable points, such as distributing stations and the like, so that upon the occurrence of a fault, the relays nearest the fault operate first and isolate the section between them without interfering with the continuity of service on the sound sections of the circuit. The current windings 10 of the relays 7, 8, are in series relation with the conductors 1, 2 respectively through the current transformers 13 and 14.

For controlling the energization of the potential windings 11, I provide means arranged selectively to connect the potential windings for energization in accordance with the potential most affected by a fault whether it be a fault between a conductor and ground or between two conductors. In the drawing such means is illustrated as a plurality of over-current relays 17 and 18 having their energizing windings or coils connected in series relation with the conductors 1 and 2 respectively.

Each of the over-current relays 17 and 18 is arranged to control contacts 20 and 21 in the energized and deenergized positions respectively so as to connect the potential windings 11 of the relays 7, 8 for energization in accordance with the desired potentials, which may be obtained by a potential transformer 16 having the neutral point of its primary winding grounded. The over-current relay 17 is arranged to control the circuit of the potential coil 11 of relay 8 and the over-current relay 18 is arranged to control the circuit of the potential coil 11 of relay 7. Normally the over-current relays 17 and 18 are in the positions shown with contacts 21 closed and the potential coil 11 of relay 7 is energized in accordance with the potential to ground of conductor 1 while the potential coil of relay 8 is energized in accordance with the potential to ground of conductor 2.

Upon the occurrence of a fault to ground on conductor 1, the current coil 10 of relay 7 and the over-current relay 17 are energized by a current proportional to the current, which includes the fault current, in conductor 1. The relay 17, which is set to operate on current above some predetermined value opens its contacts 21 and closes its contacts 20 and the potential coil 11 of relay 8 is thereby connected to be energized in accordance with the potential between conductors 1 and 2 but the over-current relay 18 does not operate since there is no fault current in conductor 2. Consequently, the potential coil 11 of relay 7 is energized in accordance with the potential to ground of conductor 1. Relay 7 is therefore energized by the current and potential most affected by the fault and operates with the desired discriminating action. In a similar manner for a fault to ground on conductor 2, the relay 8 has its current coil 10 energized by the current, which includes the fault current, in conductor 2 and its potential winding 11 energized in accordance with the potential to ground of the faulty conductor, since the over-current relay 17 remains in the position shown with its contacts 21 closed. Upon the occurrence of a fault between the conductors 1 and 2, both of the over-current relays 17 and 18 are energized and close their contacts 20. This connects the potential coil 11 of both of the relays 7 and 8 for energization in accordance with the potential between the conductors 1 and 2 which is the potential most affected. In this case, each of the relays 7 and 8 operates to effect the opening of the circuit breaker 4.

In Fig. 2, a three phase alternating current circuit comprising conductors 1, 2 and 3 is arranged to be controlled by a circuit breaker 4 having a trip coil 4'. The circuit has a neutral point 5 which may be grounded either directly or through an impedance 6.

The circuit conductors 1, 2, 3 are provided with relays 7, 8, 9, respectively, having cooperating current and potential windings 10 and 11 arranged to provide a discriminating action dependent on the current in the respective conductor and the potential to ground of this conductor or the potential between this conductor and another conductor. For obtaining the desired potentials a star-star connected potential transformer 22, having the neutral of its primary grounded, may be used.

For selectively controlling the energization of the potential windings 11, there are associated with the relays 7, 8 and 9, over-current relays 17, 18 and 19 respectively. These over-current relays are arranged to be energized by the same current as the current coil of the relay 7, 8, or 9 with which they are associated through the current transformers 13, 14 and 15.

Normally the over-current relays 17, 18 and 19 are in the positions shown with their contacts 21 closed. Under these conditions the potential coils 11 of the relays 7, 8 and 9 are connected to be energized in accordance with the potentials to ground of the respective conductors with which these relays are associated.

Upon the occurrence of a fault between one of the conductors and ground, for example, conductor 1 and ground, the current coil 10 of relay 7 and the over-current relay 17 are energized in accordance with the current, which includes the fault current, in conductor 1. The relay 17 opens its contacts 21 and closes its contacts 20, thereby connecting the potential coil 11 of the relay 9 for energization in accordance with the potential between the conductors 1 and 3 but the relays 18 and 19 do not operate. Therefore, the potential coils 11 of relays 7 and 8 remain connected through the contacts 21 of relays 18 and 19 respectively for energization in accordance with the potential to ground of the conductors 1 and 2 respectively. Consequently the current and potential coils of relay 7 are energized in accordance with the current and potential most affected by the fault.

Upon the occurrence of a fault between two conductors, for example, conductors 2 and 3, the current winding of relay 8 and the relay 18 are energized in accordance with the current in conductor 2 while the current winding of relay 9 and relay 19 are energized in accordance with the current in conductor 3. The relay 18 opens its contacts 21 and closes its contacts 20, thereby connecting the potential coil 11 of relay 7 for energization in accordance with the potential between conductors 1 and 2. The relay 19 opens its contacts 21 and closes its contacts 20, thereby connecting the potential coil 11 of relay 9 for energization in accordance with the potential between conductors 2 and 3. Consequently the current and potential windings of the relay 9 are energized in accordance with the current and potential most affected by the fault.

The operation of the protective system under abnormal conditions involving any one conductor to ground or any two or all three conductors, other than described, will, it is believed, be obvious from the preceding description, but the following tables are given to illustrate the operation for the range of fault conditions for which protection is provided. In these tables, the asterisk (*) indicates the discriminating relay which is selectively controlled by the over-current relays and which has its current and potential windings energized in accordance with the current and potential most affected by the fault so as to control the circuit breaker 4 with the desired discriminating action:

| Relays. | | Normal. | Conditions abnormal. | | |
|---|---|---|---|---|---|
| No. | | | Fault between ground, G and conductor. | | |
| | | | 1 | 2 | 3 |
| 18 | Contacts. | 21 | 21 | 20 | 21 |
| 19 | | 21 | 21 | 21 | 20 |
| 17 | Closed. | 21 | 20 | 21 | 21 |

| Coil. | | Conductor currents, C, and circuit potentials, P, energizing coils 10, 11. | | | |
|---|---|---|---|---|---|
| 7 | 10 | C | 1 | 1* | 1 | 1 |
| | 11 | P | 1 to G | 1 to G | 1 to 2 | 1 to G |
| 8 | 10 | C | 2 | 2 | 2* | 2 |
| | 11 | P | 2 to G | 2 to G | 2 to G | 2 to 3 |
| 9 | 10 | C | 3 | 3 | 3 | 3* |
| | 11 | P | 3 to G | 3 to 1 | 3 to G | 3 to G |

| Relays. | | Conditions abnormal. | | | |
|---|---|---|---|---|---|
| No. | | Fault between conductors. | | | |
| | | 1 and 2 | 2 and 3 | 3 and 1 | 1, 2 and 3 |
| 18 | Contacts. | 20 | 20 | 21 | 20 |
| 19 | | 21 | 20 | 20 | 20 |
| 17 | Closed. | 20 | 21 | 20 | 20 |

| Coil. | | Conductor currents, C, and circuit potentials, P, energizing coils 10, 11. | | | |
|---|---|---|---|---|---|
| 7 | 10 | C | 1* | 1 | 1 | 1* |
| | 11 | P | 1 to 2 | 1 to 2 | 1 to G | 1 to 2 |
| 8 | 10 | C | 2 | 2* | 2 | 2* |
| | 11 | P | 2 to G | 2 to 3 | 2 to 3 | 2 to 3 |
| 9 | 10 | C | 3 | 3 | 3* | 3* |
| | 11 | P | 3 to 1 | 3 to G | 3 to 1 | 3 to 1 |

While I have shown and described my invention in considerable detail, it is apparent to those skilled in the art that changes can be made without departing from the true spirit and scope of my invention as defined in the appended claims.

What I claim as new and desire to secure by Letters Patent of the United States, is:—

1. A protective system for an electric circuit comprising a relay having a current winding and a potential winding, and means arranged normally to connect said potential winding for energization in accordance with the potential to ground of one of the conductors of the circuit operative in response to a fault between said conductor and another conductor of the circuit to connect said potential winding for energization in accordance with the potential between said conductors.

2. A protective system for an electric circuit comprising a relay having a current winding and a potential winding, and an over-current relay arranged normally to connect said potential winding for energization in accordance with the potential to ground of one of the conductors of the circuit operative in response to a fault between said conductor and another conductor of the circuit to connect said potential winding for energization in accordance with the potential between said conductors.

3. A protective system for an electric circuit comprising a relay having a current winding connected to be energized in accordance with the current in one conductor of the circuit and a potential winding, and a relay having a current winding connected to be energized in accordance with the current in another conductor of the circuit and arranged normally to connect said potential winding for energization in accordance with the potential to ground of said one conductor operative in response to current above a predetermined value in said other conductor to connect said potential winding for energization in accordance with the potential between said conductors.

4. In a protective system for a polyphase electric circuit, a plurality of relays, one for each phase conductor of the circuit each having a current winding in series relation with the respective phase conductor and a potential winding, and means comprising a plurality of over-current relays arranged normally to connect said potential windings for energization in accordance with the potentials to ground of the respective phase conductors operative in response to abnormal circuit conditions selectively to control the energization of one of said potential windings in accordance with the potential most affected by the abnormal condition.

5. A protective system for an electric circuit comprising a relay having cooperating current and potential windings, said current winding being connected to be energized in accordance with the current in one conductor of the circuit, and means comprising a winding connected to be energized in accordance with the current in another conductor of the circuit and arranged normally to connect said potential winding for energization in accordance with the potential to ground of said one conductor and operative in response to current above a predetermined value in said other conductor to connect said potential winding for energization in accordance with the potential between said conductors.

In witness whereof, I have hereunto set my hand this 2nd day of February, 1925.

JOSEF BIERMANNS.